United States Patent [19]

Meyer

[11] Patent Number: 4,701,093

[45] Date of Patent: Oct. 20, 1987

[54] SWEEP AUGER APPARATUS

[75] Inventor: Marvin G. Meyer, Sheffield, Iowa

[73] Assignee: Sukup Manufacturing Company, Sheffield, Iowa

[21] Appl. No.: 795,701

[22] Filed: Oct. 31, 1985

Related U.S. Application Data

[63] Continuation of Ser. No. 352,796, Feb. 26, 1982, abandoned.

[51] Int. Cl.$^4$ .............................................. B65G 65/46
[52] U.S. Cl. ..................................... 414/312; 74/390; 414/326
[58] Field of Search .................... 414/306–312, 414/322–326, 301, 302, 304, 305, 266, 145, 133, 213, 390, 526; 74/390; 180/74

[56] References Cited

U.S. PATENT DOCUMENTS

| | | | |
|---|---|---|---|
| 1,293,123 | 2/1919 | Konetsky | 74/390 |
| 1,312,618 | 8/1919 | Davidson | 74/390 |
| 2,678,241 | 5/1954 | Miller | 414/322 X |
| 3,127,032 | 3/1964 | Roberts . | |
| 3,356,235 | 12/1967 | Laidig . | |
| 3,391,809 | 7/1968 | Weaver et al. . | |
| 3,486,643 | 12/1969 | Smith . | |
| 3,647,094 | 3/1972 | Jackson | 414/312 |
| 4,008,816 | 2/1977 | Harrison | 414/310 |
| 4,033,466 | 7/1977 | Easton | 414/301 |
| 4,063,654 | 12/1977 | Shivvers . | |
| 4,217,701 | 8/1980 | Matthews | 414/310 |
| 4,248,538 | 2/1981 | Sukup | 366/261 |

FOREIGN PATENT DOCUMENTS 1133310 7/1962 Fed. Rep. of Germany ...... 414/306

Primary Examiner—Frank E. Werner
Attorney, Agent, or Firm—Neuman, Williams, Anderson & Olson

[57] ABSTRACT

A sweep auger apparatus is radially disposed within a circular bin for moving a free flowing granular material across the floor of the bin toward the center of the bin. A motor is connected to the radially inner end of the auger shaft to rotate the auger about its horizontal axis. A drive wheel assembly is connected to the radially outer end of the auger shaft for supporting the outer end of the auger shaft and for revolving the auger around the central vertical axis of the bin. The drive wheel assembly includes a speed reduction mechanism whereby the speed of rotation of the drive wheel is substantially less than the speed of rotation of the auger shaft.

6 Claims, 7 Drawing Figures

SWEEP AUGER APPARATUS

This application is a continuation of application Ser. No. 352,796 filed Feb. 26, 1982 now abandoned.

This invention relates to auger apparatus, and more particularly to sweep augers suitable for moving granular material across the floor of a circular storage bin toward the center of the bin.

Sweep augers have long been used to unload grain or other granular material from circular storage bins. In such apparatus, a radially disposed auger rotates about its own axis to drag the granular material to an unloading sump at the center of the bin. Simultaneously, the auger revolves around the central vertical axis of the bin to advance across the bin floor in a sweeping action. The auger shaft typically is rotated by power means connected to the radially inner end of the shaft. A drive wheel often is attached to the radially outer end of the auger shaft for rotation therewith to support the outer portion of the auger, as well as to assist in driving the auger in its sweeping motion. While such arrangements provide for ease of manufacturing, certain operating and other disadvantages are inherent in the equipment. Auger shafts typically rotate at several hundred revolutions per minute to achieve the desired unloading capacity. However, this results in a peripheral velocity of the support wheel which is far greater than the rate of advancement of the outer end of the auger and hence of the wheel. This results in excessive slippage of the wheel on the support floor. Hence, the drive wheel wears out quickly if its periphery is made of rubber or other relatively soft traction material, as is desirable to provide sufficient frictional engagement with the steel bin floor to accomplish the sweeping motion. On the other hand, if the drive wheel periphery were made of steel or other hard material, the wheel often would not provide adequate traction for satisfactorily advancing the auger into the granular material, and would wear the bin floor.

In the past, the aforesaid disadvantages have been overcome or minimized only with more complex apparatus and at considerably greater expense. In one such instance (see U.S. Pat. No. 3,127,032) a separate drive shaft extends coaxially through the auger shaft and drives a sprocket at a rotational speed independent of the speed of the rotating auger, the sprocket engaging a circular perforated track to provide a positive drive during the sweeping action. In other instances, auxiliary motors have been provided to drive sprockets or gears which similarly engage circular tracks to effect a positive drive for sweeping (see e.g., U.S. Pats. Nos. 3,356,235; 3,391,809; and 3,489,643). In yet another instance (see U.S. Pat. No. 4,063,654), a sweep auger shaft rotatably carries a floor engaging wheel which rides on a smooth portion of a circular track and, in addition, speed reduction gearing is driven from the auger shaft to operate an eccentrically mounted drive ratchet which engages a toothed portion of the track to effect a positive drive during the sweeping action. All of these constructions are unnecessarily cumbersome and expensive.

It is an object of this invention to provide improved support and drive arrangements for sweep augers.

A further object of this invention is to provide an economical sweep auger apparatus which avoids the problems of the aforementioned apparatus.

Another object of the invention is to provide a sweep auger apparatus which enables the auger shaft to be rotated about its longitudinal axis at a speed sufficient to achieve the desired bin unloading capacity and at the same time to drive a drive wheel on the apparatus at such sufficiently lesser speed that the wheel engages the bin floor with greatly reduced slippage as the auger revolves around the central vertical axis of the bin in unloading material from the bin.

A further object of the invention is to provide a sweep auger apparatus which may be effectively employed to unload granular material from a circular storage bin without requiring a special circular track or the like around the periphery of the bin floor to effect a positive drive for the sweeping action.

A still further object of this invention is to provide an economical sweep auger apparatus in which a single power source is employed both to rotate the auger about its longitudinal axis and to rotate the drive wheel which supports the radially outer end of the auger at a substantially lesser speed.

Other objects of the invention will become apparent from the following detailed description including the drawings, in which.

Figure 1:
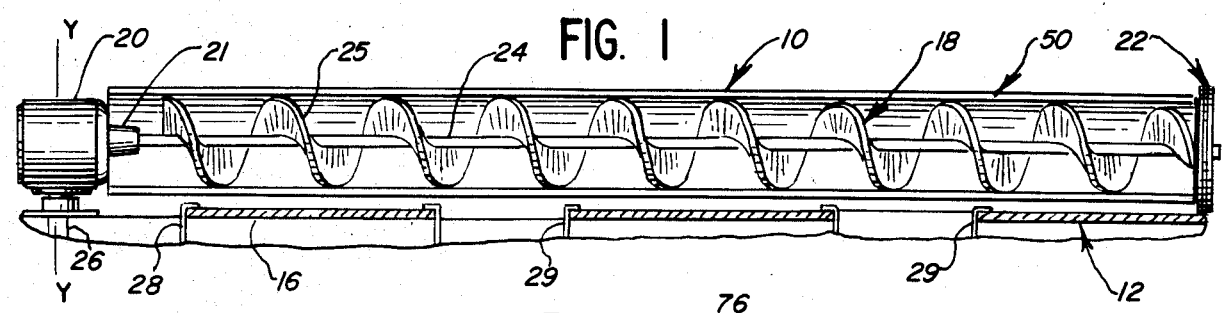
FIG. 1 is a longitudinal side view, partially broken away, illustrating one embodiment of a sweep auger apparatus radially disposed above the floor of a circular storage bin and employing the invention.
Figure 2:
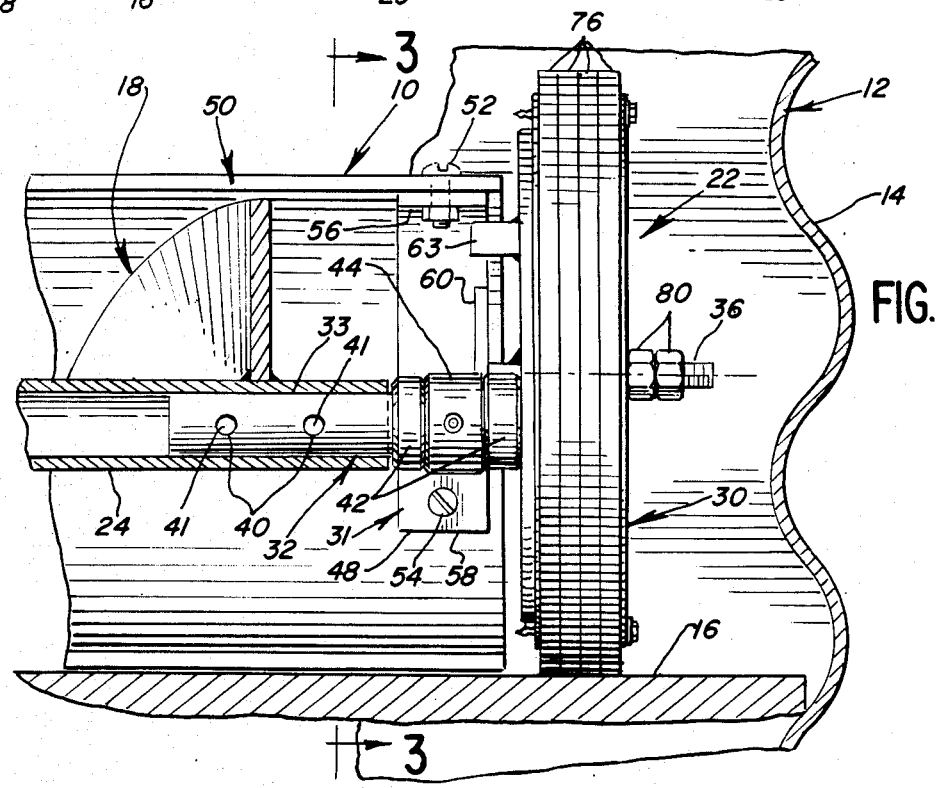
FIG. 2 is an enlarged side view, partially in section, of the radially outer end of the apparatus of the invention shown in FIG. 1.

A sweep auger apparatus 10 embodying this invention is illustrated in FIGS. 1 and 2 in assembled relationship with a circular grain storage bin 12 having a vertical generally cylindrical side wall 14 and a circular false bottom or floor 16, e.g., a bin as shown in Sukup U.S. Pat. No. 3,532,232, which is incorporated herein by reference. The apparatus 10 includes a radially extending sweep auger 18, which is rotatably mounted within the bin 12 above the proximate to the floor 16, and a drive wheel assembly 22. A drive train for operating the auger apparatus 10 includes a drive unit housing 20 at the center of the bin with a drive coupling element, e.g., a threaded shaft (not shown), engaging a female threaded coupling 21 secured to the end of the auger shaft for drive connection to the radially inner end of the auger 18. The auger 18 includes an axial drive shaft 24 and helical flighting 25 suitably attached to the shaft. The drive wheel assembly 22 is disposed at the radially outer end of the auger for supporting the outer end of the auger on the floor 16 and for revolving the auger about the central vertical axis y-y of the bin 12.

The housing 20 encloses power means which may include suitable gears and/or a motor (not shown) for rotating the auger shaft 24 and hence the auger 18 about their common longitudinal axis. Alternatively, the housing 20 may enclose only suitable gearing engaging a vertical shaft 26 which extends below the bin floor 16 and which is driven by a motor (not shown) located below the floor 16 or outside of the storage bin 12.

In operation, as will be more fully described hereinbelow, when the auger 18 rotates about its longitudinal axis and the entire sweep auger apparatus 10 revolves over the bin floor 16 about the central vertical axis y-y thereof, granular material (not shown) stored in the bin is caused to be moved across the floor 16 toward and into a central sump opening 28 of the bin floor. The stored material typically is a free-flowing material such as grain, e.g., shelled corn. After the granular material falls through the central opening 28 it may then be transported exteriorly of the bin by an unloading conveyor (not shown) beneath the floor 16.

The illustrated sweep auger apparatus 10 is intended for use in removing the remaining material from a bin 12 following primary gravity unloading of the bin first through the center sump 28 and then through dump openings 29. The latter openings are aligned over and communicate with the aforenoted subjacent unloading conveyor which extends radially outward of the bin from the center sump 28 beneath floor 16.

Briefly, when bin 12 is loaded with free flowing material such as grain, the sweep auger apparatus 10 normally is positioned over the openings 29, as illustrated in FIG. 1, and the outlet openings 28 and 29 are closed by movable closures (not shown). In unloading the bin 12, sump 28 is first opened and as much material is removed as will flow to that opening by gravity. This leaves a ring of the material covering the floor 16 to depths increasing in each radial direction from opening 28 to the bin wall 14, i.e., as defined by an inverted cone having a vertical axis coincident with bin axis y-y and its sides at the angle of repose of the material. The dumps 29 then are opened and the material thereover is permitted to flow out therethrough by gravity to its angle of repose around those openings. This removes most of the material in one radial segment, above and around the sweep auger apparatus 10, thereby reducing the starting torque required to initiate operation of a relatively large auger 18 and permitting such operation. Thereupon, the power drive to the sweep auger 10 through the drive unit in housing 20 is engaged. The sweep auger advances slowly around the bin, conveying the remaining material to the center sump, as described above, as it advances.

When unloading free-flowing materials as described herein, the sweep auger apparatus 10 typically makes a single revolution, or single sweep around the bin to remove the ring of material which is outside the angles of repose of the material and which therefore did not freely slide into the openings 28 and 29 by gravity. Such a sweep revolution may take on the order of one hour, depending upon the quantity of material remaining for removal and the capacity of the auger.

Figure 3:
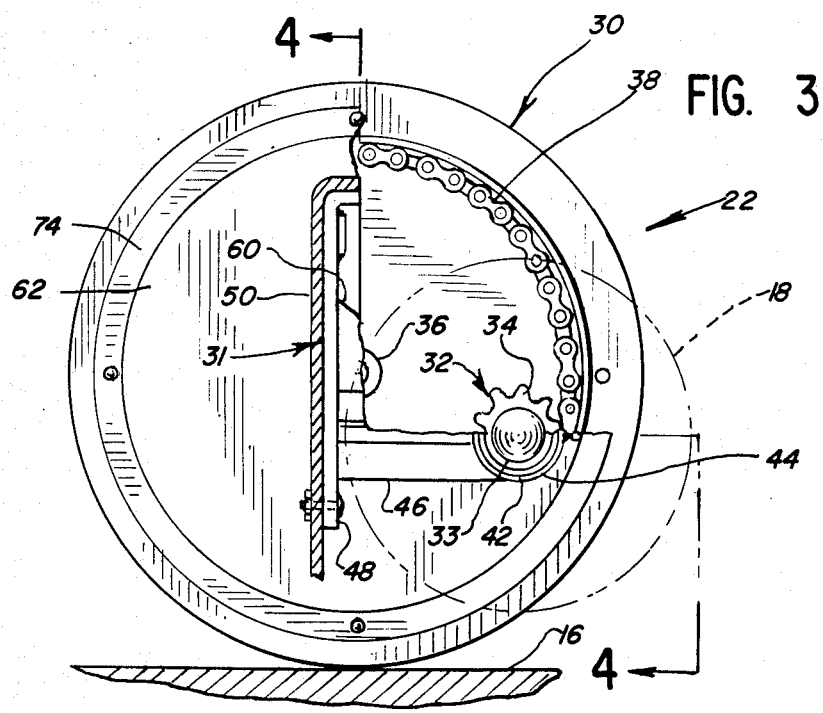
FIG. 3 is a sectional view, partially broken away, taken in the direction of the arrows 3—3 of FIG. 2.
Figure 4:
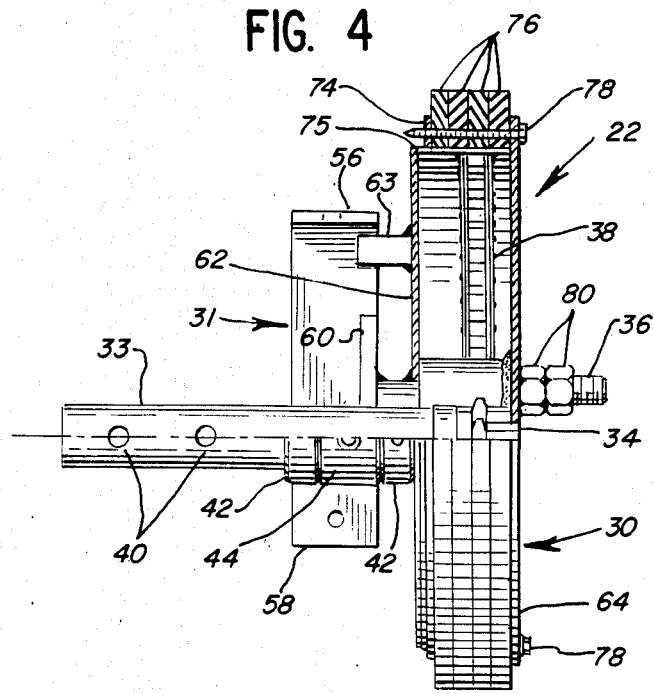
FIG. 4 is a partial sectional view of the drive wheel assembly of the apparatus of the invention, taken in the direction of the arrows 4—4 of FIG. 3.

As best seen in FIGS. 2, 3 and 4, the drive wheel assembly 22 comprises a drive wheel 30, a support structure 31 for rotatably mounting that wheel at the outer end of the auger assembly, and a speed reduction drive 32 for coupling with the shaft 24 and driving the wheel 30 therefrom. The drive system 32 is independent of the support structure 31 and drives the wheel 30 at a reduced speed relative to the speed of rotation of the auger. The drive 32 includes a first shaft 33 and a sprocket 34 secured to the shaft 33 for rotation therewith to drive the wheel by engaging an annular mating sprocket chain 38 secured to the wheel, as described further below. The support structure 31 includes a second shaft 36 spaced from and parallel to the shaft 33 for rotatably mounting the drive wheel 30.

The drive wheel 30 rolls on the floor 16 of the bin and thus supports the radially outer end of the sweep auger apparatus 10. A circularly disposed sprocket chain 38 (FIGS. 3 and 4) is fixedly secured to the inner periphery 73 of the drive wheel 30 and effectively but very economically forms a large annular internal gear which is engaged by the sprocket 34. By reason of this construction, when the drive wheel assembly 22 is operatively connected as a part of the sweep auger apparatus 10, rotation of shaft 33 causes rotation of the drive wheel 30 in the same direction, but at a greatly reduced speed of rotation. The dimensions of the sprocket 34 and sprocket chain 38 are selected to obtain a desired angular velocity of wheel 30 relative to the angular velocity of the auger 18 about the bin axis y-y. In one embodiment an approximately 5 to 1 speed reduction is used, e.g., when the drive shaft 24 and hence shaft 33 are caused to rotate at approximately 400 r.p.m. the drive wheel 30 rotates at approximately 80 r.p.m. The wheel 30 will provide a steady advancing force to continuously press the auger 18 into the pile of remaining material, with slippage of the wheel accommodating the slow advance while assuring continued forcing of the auger into the material. However, the slippage is controlled and greatly reduced as compared, for example, to prior direct drive arrangements.

Figure 6:
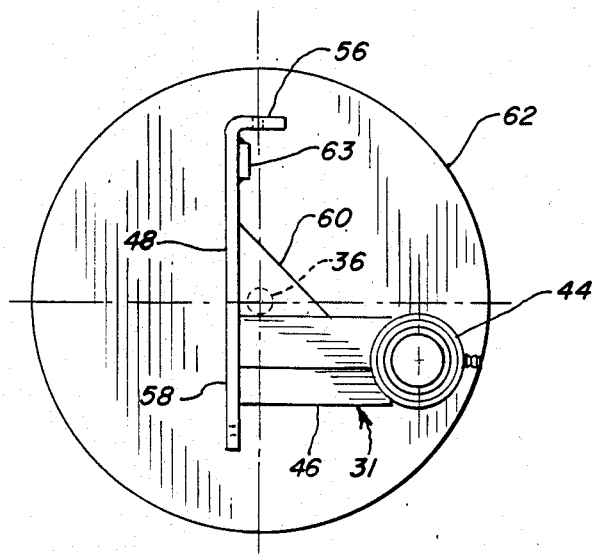
FIG. 6 is a vertical axial view of another portion of the drive wheel assembly shown in FIG. 4.

Further details of the illustrated drive wheel assembly 22 and its manner of attachment to the auger apparatus 10 are best described with reference to FIGS. 2, 3 and 4. The radially inner end of shaft 33 is dimensioned to be snugly and coaxially recieved telescopically in the outer end of the auger shaft 24 and to be fixed thereto for rotation therewith by means of holes 40 (FIG. 2) and mating pins 41 therein. A pair of axially spaced-apart collars 42 are keyed to shaft 33. The support structure 31 includes a bearing 44 disposed between these collars 42 for rotation of the shaft 33 therein. As seen in FIG. 6, a T-shaped brace 46 is secured at one end to the exterior of the bearing 44 and a vertically disposed backboard support 48 is secured to the other end of the brace 46. A vertical backboard 50 extends the full length of the auger 18 and is disposed proximate to its trailing edge. The backboard 50 is fixedly secured at its radially inner end to the housing 20 (FIG. 1) and at its radially outer end to the horizontal and vertical flanges 56 and 58 respectively of the backboard support 48, as by bolts 52, 54.

Figure 7:
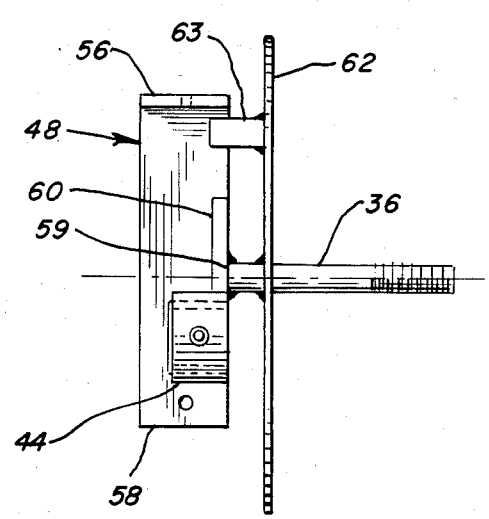
FIG. 7 is a longitudinal side view of the portion of the drive wheel assembly illustrated in FIG. 6.

As best seen in FIGS. 6 and 7, a vertically disposed triangularly shaped bracing plate 60 also is secured to the brace 46 and the vertical flange 58 of the backboard support 48 to reinforce the rigid connection therebetween. The radially inner end 59 of shaft 36 of the drive wheel assembly 22 is fixedly secured, as by welding, to the bracing plate 60 (FIG. 7). A circular casing cover plate 62 for the wheel 30 is secured to shaft 36 in a vertical position, as by being welded thereto outwardly of the bracing plate 60. A central aperture through plate 62 receives shaft 36. An additional brace 63 extends between and is welded to cover plate 62 and backboard support 48 to assist in maintaining cover plate 62 in a vertical position.

Figure 5:
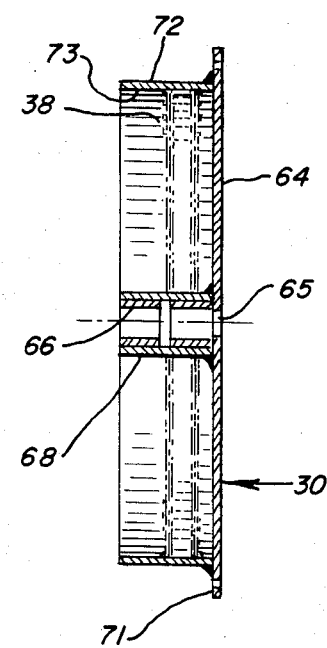
FIG. 5 is a vertical longitudinal sectional view of a portion of the drive wheel assembly shown in FIG. 4.

As best seen in FIGS. 4 and 5, drive wheel 30 includes a circular plate 64 which has a central opening 65 to receive the shaft 36. A bushing 66, adapted to rotatably engage shaft 36, is disposed within a surrounding center post 68. The outer end of post 68 is welded to the circular back plate 64 in axial alignment with opening 65. A cylindrical casing ring 72 is concentrically positioned with respect to the longitudinal axis of bushing 66 and is secured to the radially inner surface 71 of plate 64. The sprocket chain 38 is welded at spaced-apart intervals to the inner cylindrical surface 73 of the casing ring 72.

An annular clamp ring 74 (FIG. 4) is removably received around the outer cylindrical surface 75 of the casing ring 72 at a distance spaced-apart axially from the back plate 64 to accommodate therebetween a plurality of replaceable annular wheel tread segments 76 which may be of rubber or other appropriate traction material. These wheel segments are secured to the drive wheel 30 by a plurality of circumferentially spaced-apart screws 78 extending through and between the back plate 64 and clamp ring 74. The fully assembled wheel assembly 30 is rotatably secured on shaft 36 by a pair of nuts 80 which engage the threaded free end of the shaft.

As hereinbefore indicated, in operation, when the auger shaft 24 is caused to be rotated about its longitudinal axis, the drive wheel 30 is caused to be rotated in the same direction, but at a substantially lesser speed as a result of the sprocket and sprocket chain connection between the auger shaft and drive wheel. This speed reduction enables the auger shaft 24 to be rotated at a speed sufficient to achieve the desired bin unloading capacity and at the same time permits the drive wheel 30 to rotate at a sufficiently lesser speed to enable it to frictionally engage the bin floor and to avoid undue wear on the drive wheel or the floor.

While the operation of the sweep auger apparatus 10 is described above with the apparatus permanently installed in the bin 12, it will be appreciated that the sweep auger may be removable. In that event, the sweep auger is removed before the bin is filled, as by uncoupling at connection 21 and dismounting the backboard 50 from housing 20. In the unloading operation, the removable sweep auger then would be installed in the bin after the primary gravity unloading through opening 28 or openings 28 and 29 is completed. It will be appreciated that at that stage of unloading, the center drive mechanism, e.g., 20, is exposed for the initial positioning and connection of a sweep auger apparatus 10. Inclusion of a universal joint at the connector 21 or use of a pivotally mounted power source will accommodate angular misalignment, including initial positioning of the auger at an upward angle corresponding to the angle of repose of the material if there are no openings 29. However, if openings 29 are included and used, then an effectively open channel is formed in the grain over the dump ports 29 for substantially horizontal installation of the removable auger unit.

While particular embodiments of the invention have been described, it will be understood, of course, that the invention is not limited thereto since many modifications may be made, and it is therefore contemplated to cover any such modifications as fall within the true spirit and scope of the invention.

What is claimed is:

1. Apparatus for moving granular material radially of a circular storage bin along a floor of the bin toward the center of the bin floor, said apparatus comprising: an elongate auger with a longitudinal axis to be disposed radially of such a bin above and proximate the floor thereof, said auger having a leading edge, a trailing edge, one end disposed at the center of the bin and a distal end disposed radially outward of the center of the bin, said one end of said auger including means for connection to power means at the center of such a bin for rotating said auger about its longitudinal axis; a support and drive assembly located radially outward of the auger and mounted on the distal end of said auger; said support and drive assembly including a first shaft coaxially secured to said auger for rotation therewith, a second shaft disposed rearward of said first shaft, a drive wheel mounted on said second shaft for supporting said distal end of said auger on such a floor and for advancing said auger around the central vertical axis of such a bin, and a speed reduction gear drive connected to said first shaft for rotating said drive wheel at a speed of rotation which is substantially less than the speed of rotation of said auger and for transmitting an advancing force from said auger to said drive wheel; said support and drive assembly providing the sole support for said distal end of said auger and being disposed entirely rearward of the leading edge of said auger so that the leading edge of the auger protrudes forwardly of the support and drive assembly for engaging the granular material ahead of the support and drive assembly.

2. Apparatus for moving free-flowing granular material radially of a circular storage bin along a floor of the bin toward the center of the bin floor, said apparatus comprising: an elongate sweep auger with a longitudinal axis and including an auger shaft, said auger extending radially of the bin above the proximate the floor thereof, said auger having a leading side, a trailing side, an inner end, and an outer end; power means connected to the inner end of said auger shaft for rotating said auger about its longitudinal axis; a housing structure for said power means; a support and drive assembly located radially outward of the auger and mounted on the outward end of said auger as the sole support for said outer end of said auger on said floor and for advancing said auger around the central vertical axis of said bin; a backboard having an inner and outer end and an upright rear wall adjacent the trailing side of said auger, the inner end of said backboard being secured to said housing structure and the outer end of said backboard being supported by said support and drive assembly; said support and drive assembly including a first shaft coaxially secured to said auger shaft for rotation therewith, a second shaft disposed rearward of said first shaft, a drive wheel mounted on said second shaft for supporting the outer end of said auger on said floor and for advancing said auger around the central vertical axis of said bin and a speed reduction gear drive connected to said first shaft for rotating said drive wheel at a speed of rotation which is substantially less than the speed of rotation of said auger and for transmitting an advancing force from said auger to said drive wheel, said gear drive including a first gear carried on said first shaft for rotation therewith, a second gear connected to said drive wheel for rotation therewith and to said first gear, whereby rotation of said first shaft causes rotation of said drive wheel, said support and drive assembly being disposed entirely rearward of the leading edge of said auger so that the leading edge of the auger protrudes forwardly of the support and drive assembly for engaging the granular material ahead of the support and drive assembly.

3. A support and drive assembly for providing the sole support for the radially outer end of an elongate sweep auger on a floor of a circular storage bin and for advancing said auger around the bin, said auger having a leading edge and a trailing edge and including an auger shaft with a longitudinal axis, an inner end disposed at the center of said floor and connected to power means for rotating said auger shaft about its longitudinal axis, and said outer end being disposed radially outward of the center of the floor, said assembly comprising: a first shaft adapted to be coaxially secured to said auger shaft for rotation therewith about said longitudinal axis, a bearing on said first shaft in which said first shaft rotates about said longitudinal axis, a bracket member fixedly secured to said bearing, a second shaft parallel to said first shaft and disposed to be spaced from said first shaft toward the trailing edge of said auger, one end of said second shaft being fixedly secured to said bracket member, a drive wheel rotatably mounted on said second shaft, and speed reduction means for driving said drive wheel in response to rotation of said first shaft and at a speed of rotation of said drive wheel substantially less than the speed of rotation of said auger shaft, said first shaft, second shaft, bearing, bracket member, and drive wheel being disposed entirely rearward of the leading edge of said auger so that the leading edge of the auger protrudes forwardly of the support and drive assembly for engaging the granular material ahead of the support and drive assembly.

4. A support and drive assembly according to claim 3 wherein said reduction means comprises: a first gear means carried on said first shaft for rotation therewith, and a second gear means secured to said drive wheel and engaging said first gear means whereby rotation of said first shaft causes rotation of said drive wheel.

5. A support and drive assembly as in claim 4 wherein said first gear means is a sprocket and said second gear means is a circular sprocket chain.

6. Apparatus for moving granular material radially of a circular storage bin along a floor of the bin toward the center of the bin floor, said apparatus comprising: an elongate auger with a longitudinal axis to be disposed radially of such a bin above and proximate the floor thereof, said auger having a leading edge, a trailing edge, one end disposed at the center of said bin and an opposite distal end disposed radially outward of the center of the bin, said one end of said auger including means for connection to power means at the center of said bin for rotating said auger about its longitudinal axis, a support and drive wheel located proximate to the distal end of said auger for supporting said distal end of said auger on said floor and for advancing said auger around the central vertical axis of said bin, and a speed reduction means disposed within said wheel and connected to said auger and said drive wheel for rotating said drive wheel at a speed of rotation which is substantially less than the speed of rotation of said auger, said drive wheel providing the sole support for said distal end of said auger and being disposed rearward of said leading edge of said auger.

* * * * *